(12) United States Patent
LeTourneau (10) Patent No.: US 7,882,147 B2
(45) Date of Patent: Feb. 1, 2011

(54) FILE LOCATION NAMING HIERARCHY

(75) Inventor: Jack J. LeTourneau, Santa Barbara, CA (US)

(73) Assignee: Robert T. and Virginia T. Jenkins, Sacramento, CA (US), as Trustees of the Jenkins Famiy Trust Dated Feb. 8, 2002

( * ) Notice: Subject to any disclaimer, the term of this patent is extended or adjusted under 35 U.S.C. 154(b) by 1100 days.

(21) Appl. No.: 11/006,320

(22) Filed: Dec. 6, 2004

(65) Prior Publication Data

US 2006/0015538 A1 Jan. 19, 2006

Related U.S. Application Data

(60) Provisional application No. 60/584,734, filed on Jun. 30, 2004.

(51) Int. Cl.
*G06F 12/00* (2006.01)

(52) U.S. Cl. .................................. 707/803; 707/829

(58) Field of Classification Search ................ 707/100, 707/200, 205, 1, 10, 101, 102, 103 X, 103 Y, 707/103 Z, 103 R, 104.1, 790, 793, 795, 707/796, 802, 803, 829, 828, 756, 953, 956, 707/999.1, 999.101, 999.2, 778
See application file for complete search history.

(56) References Cited

U.S. PATENT DOCUMENTS

| | | | |
|---|---|---|---|
| 4,156,910 A | 5/1979 | Barton et al. | |
| 4,745,561 A | 5/1988 | Hirosawa et al. | |
| 4,751,684 A | 6/1988 | Holt | |
| 4,831,525 A | 5/1989 | Saito et al. | |
| 4,905,138 A | 2/1990 | Bourne | |
| 4,931,928 A | 6/1990 | Greenfeld | |
| 4,949,388 A | 8/1990 | Bhaskaran | |
| 4,989,132 A | 1/1991 | Mellender et al. | |
| 4,991,087 A | 2/1991 | Burkowski et al. | |
| 5,021,992 A | 6/1991 | Kondo | |
| 5,191,522 A | 3/1993 | Bosco et al. | |
| 5,235,701 A | 8/1993 | Ohler et al. | |
| 5,265,245 A | 11/1993 | Nordstrom et al. | |
| 5,295,261 A | 3/1994 | Simonetti | |
| 5,497,500 A | 3/1996 | Rogers et al. | |
| 5,509,088 A | 4/1996 | Robson | |
| 5,598,350 A | 1/1997 | Kawanishi et al. | |
| 5,606,669 A | 2/1997 | Bertin et al. | |
| 5,724,512 A * | 3/1998 | Winterbottom | 709/226 |
| 5,724,576 A | 3/1998 | LeTourneau | |
| 5,758,152 A | 5/1998 | LeTourneau | |
| 5,781,906 A | 7/1998 | Aggarwal et al. | |
| 5,787,415 A * | 7/1998 | Jacobson et al. | 707/2 |
| 5,787,432 A | 7/1998 | LeTourneau | |

(Continued)

OTHER PUBLICATIONS

Sechrest et al., Blending Hierarchical and Attribute-Based File Naming, Distributed Computing System, 1992., Proceedings of the 12th International Conference on, Jun. 9-12, 1992, pp. 572-580.*

(Continued)

*Primary Examiner*—Greta L Robinson
(74) *Attorney, Agent, or Firm*—Berkeley Law & Technology Group, LLP (57) ABSTRACT

Embodiments of methods, apparatuses, devices and/or systems for a file location naming hierarchy are disclosed.

6 Claims, 6 Drawing Sheets

U.S. PATENT DOCUMENTS

| | | | |
|---|---|---|---|
| 5,796,356 | A | 8/1998 | Okada et al. |
| 5,848,159 | A | 12/1998 | Collins et al. |
| 5,978,790 | A | 11/1999 | Buneman et al. |
| 5,999,926 | A | 12/1999 | Suciu |
| 6,002,879 | A | 12/1999 | Radigan et al. |
| 6,055,537 | A * | 4/2000 | LeTourneau ............... 707/101 |
| 6,141,655 | A | 10/2000 | Johnson et al. |
| 6,199,103 | B1 | 3/2001 | Sakuguchi |
| 6,236,410 | B1 | 5/2001 | Politis et al. |
| 6,289,354 | B1 | 9/2001 | Aggarwal et al. |
| 6,442,584 | B1 | 8/2002 | Kolli et al. |
| 6,542,899 | B1 | 4/2003 | Saulpaugh et al. |
| 6,550,024 | B1 | 4/2003 | Pagurek et al. |
| 6,598,052 | B1 | 7/2003 | Saulpaugh et al. |
| 6,606,632 | B1 | 8/2003 | Saulpaugh et al. |
| 6,609,130 | B1 | 8/2003 | Saulpaugh et al. |
| 6,611,844 | B1 | 8/2003 | Saulpaugh et al. |
| 6,658,649 | B1 | 12/2003 | Bates et al. |
| 6,714,939 | B2 | 3/2004 | Saldanha et al. |
| 6,763,515 | B1 | 7/2004 | Vazquez et al. |
| 6,785,673 | B1 | 8/2004 | Fernandez et al. |
| 6,965,990 | B2 | 11/2005 | Barsness et al. |
| 6,968,330 | B2 | 11/2005 | Edwards et al. |
| 7,051,033 | B2 * | 5/2006 | Agarwal et al. ............. 707/100 |
| 7,072,904 | B2 | 7/2006 | Najork et al. |
| 7,103,838 | B1 | 9/2006 | Krishnamurthy et al. |
| 7,162,485 | B2 | 1/2007 | Gottlob et al. |
| 7,191,182 | B2 * | 3/2007 | Anonsen et al. ............. 707/100 |
| 7,203,774 | B1 | 4/2007 | Zhou et al. |
| 7,287,026 | B2 | 10/2007 | Oommen |
| 7,313,563 | B2 | 12/2007 | Bordawekar et al. |
| 7,318,215 | B1 | 1/2008 | Krishnan et al. |
| 7,356,802 | B2 | 4/2008 | de Sutter et al. |
| 7,360,202 | B1 | 4/2008 | Seshadri et al. |
| 7,512,932 | B2 | 3/2009 | Davidov et al. |
| 7,561,927 | B2 | 7/2009 | Oyama et al. |
| 7,620,632 | B2 | 11/2009 | Andrews |
| 7,627,591 | B2 | 12/2009 | LeTourneau |
| 7,630,995 | B2 | 12/2009 | LeTourneau |
| 7,636,727 | B2 | 12/2009 | Schiffmann et al. |
| 7,681,177 | B2 | 3/2010 | LeTourneau |
| 2002/0040292 | A1 | 4/2002 | Marcu |
| 2002/0129129 | A1 | 9/2002 | Bloch et al. |
| 2002/0133497 | A1 | 9/2002 | Draper et al. |
| 2002/0169563 | A1 | 11/2002 | De Carvalho Ferreira |
| 2003/0041088 | A1 | 2/2003 | Wilson et al. |
| 2003/0065659 | A1* | 4/2003 | Agarwal et al. ................ 707/4 |
| 2003/0130977 | A1 | 7/2003 | Oommen |
| 2003/0167445 | A1 | 9/2003 | Su et al. |
| 2003/0195885 | A1 | 10/2003 | Emmick et al. |
| 2003/0195890 | A1 | 10/2003 | Oommen |
| 2003/0236794 | A1 | 12/2003 | Hostetter et al. |
| 2004/0010752 | A1 | 1/2004 | Chan et al. |
| 2004/0103105 | A1 | 5/2004 | Lindblad et al. |
| 2004/0215642 | A1* | 10/2004 | Cameron et al. ............. 707/100 |
| 2004/0239674 | A1 | 12/2004 | Ewald et al. |
| 2004/0260683 | A1 | 12/2004 | Chan et al. |
| 2005/0027743 | A1 | 2/2005 | O'Neil et al. |
| 2005/0060332 | A1 | 3/2005 | Bernstein et al. |
| 2005/0125432 | A1 | 6/2005 | Lin et al. |
| 2005/0187900 | A1 | 8/2005 | LeTourneau |
| 2005/0267908 | A1 | 12/2005 | LeTourneau |
| 2006/0004817 | A1 | 1/2006 | Andrews |
| 2006/0095442 | A1 | 5/2006 | LeTourneau |
| 2006/0095455 | A1 | 5/2006 | LeTourneau |
| 2006/0123029 | A1 | 6/2006 | LeTourneau |
| 2006/0129582 | A1 | 6/2006 | Schiffmann |
| 2006/0259533 | A1 | 11/2006 | LeTourneau |
| 2006/0271573 | A1 | 11/2006 | LeTourneau |
| 2007/0198538 | A1 | 8/2007 | Palacios |
| 2010/0094885 | A1 | 4/2010 | Andrews |

OTHER PUBLICATIONS

ACM Portal Search Results (Kleene and prime and enumeration and operation and natural and numerals and sequences and "enumeration operation") conducted by Examiner on Jul. 18, 2009, 6 pages.

ACM Portal Search Results (Kleene and prime and enumeration and operation and natural and numerals and sequences and enumeration and operation) conducted by Examiner on Jul. 18, 2009, 1 page.

Google Search (Kleene prime enumeration operation) conducted by Examiner on Jul. 18, 2009, 2 pages.

Google search (Kleene prime enumeration operation natural numerals sequences "Kleene prime") conducted by Examiner on Jul. 18, 2009, 2 pages.

Google Search (Kleene prime enumeration operation natural numerals sequences "enumeration operation") conducted by Examiner on Jul. 18, 2009, 2 pages.

Iacob et al., "XPath Extension for Querying Concurrent XML Markup", Technical Report #TR 394-04, Department of Computer Science, University of Kentucky, Lexington, KY 40506, Mar. 6, 2004, 15 pages.

IEEE Explore Digital Library Search Result conducted by Examiner on Jul. 18, 2009, 1 page.

Leinonen et al., "Automation of Document Structure Transformations", Auditorium, Microteknia Building, University of Kuopio, Nov. 5, 2004, 68 pages.

Lerman et al., "Learning the Common Structure of Data", American Association for Artificial Intelligence, AAAI-00 Proceedings, www.aaai.org, Apr. 13, 2000, 6 pages.

Wu, "A Prime Number Labeling Scheme for Dynamic Ordered XML Trees", IEEE, 2004, 13 pages.

Response filed Jul. 21, 2008 in co-pending U.S. Appl. No. 11/005,859, 86 pages.

Final Office Action mailed Oct. 30, 2008 in co-pending U.S. Appl. No. 11/005,859, 14 pages.

Response filed Dec. 30, 2008 in co-pending U.S. Appl. No. 11/005,859, 82 pages.

Advisory Action mailed Jan. 13, 2009 in co-pending U.S. Appl. No. 11/005,859, 3 pages.

RCE and Amendment filed Apr. 30, 2009 in co-pending U.S. Appl. No. 11/005,859, 86 pages.

Final Office action mailed Jul. 8, 2009 in co-pending U.S. Appl. No. 11/005,859, 8 pages.

Final Office action mailed Aug. 15, 2008 in co-pending U.S. Appl. No. 11/007,139, 22 pages.

Response filed Oct. 15, 2008 in co-pending U.S. Appl. No. 11/007,139, 23 pages.

Advisory action mailed Oct. 22, 2008 in co-pending U.S. Appl. No. 11/007,139, 26 pages.

RCE and Amendment filed Nov. 14, 2008 in co-pending U.S. Appl. No. 11/007,139, 27 pages.

Office action mailed Dec. 8, 2008 in co-pending U.S. Appl. No. 11/007,139, 17 pages.

Amendment filed May 8, 2009 in co-pending U.S. Appl. No. 11/007,139, 26 pages.

Final Office action mailed Aug. 4, 2009 in co-pending U.S. Appl. No. 11/007,139, 18 pages.

Response filed Aug. 4, 2008 in co-pending U.S. Appl. No. 11/006,848, 27 pages.

Final Office action mailed Dec. 2, 2008 in co-pending U.S. Appl. No. 11/006,848, 30 pages.

RCE and Amendment filed May 4, 2009 in co-pending U.S. Appl. No. 11/006,848, 24 pages.

Notice of Allowance mailed Jun. 11, 2009 in co-pending U.S. Appl. No. 11/006,848, 8 pages.

Issue Fee filed Sep. 11, 2009 in co-pending U.S. Appl. No. 11/006,848, 10 pages.

Response to Restriction Requirement filed Jul. 17, 2008 in co-pending U.S. Appl. No. 11/006,841, 33 pages.

Final Office Action, mailed Oct. 29, 2008 in co-pending U.S. Appl. No. 11/006,841, 54 pages.

Response filed Dec. 29, 2008 in co-pending U.S. Appl. No. 11/006,841, 45 pages.
Advisory Action mailed Jan. 6, 2009 in co-pending U.S. Appl. No. 11/006,841, 3 pages.
RCE and Amendment filed Apr. 23, 2009 in co-pending U.S. Appl. No. 11/006,841, 48 pages.
Supplemental Response filed Jun. 26, 2009 in co-pending U.S. Appl. No. 11/006,841, 34 pages.
Notice of Allowance mailed Jun. 29, 2009 in co-pending U.S. Appl. No. 11/006,841, 40 pages.
Issue Fee filed Sep. 29, 2009 in co-pending u.S. Appl. No. 11/006,841, 4 pages.
Notice of Appeal filed Aug. 4, 2008 in co-pending U.S. Appl. No. 11/006,440, 1 page.
Final Office action mailed Jan. 23, 2009 in co-pending U.S. Appl. No. 11/006,440, 22 pages.
RCE and Amendment filed Nov. 4, 2008 in co-pending U.S. Appl. No. 11/006,440, 39 pages.
Amendment After Final filed Apr. 23, 2009 in co-pending U.S. Appl. No. 11/006,440, 34 pages.
Supplemental Amendment filed Jul. 17, 2009 in co-pending U.S. Appl. No. 11/006,440, 29 pages.
Notice of Allowance mailed Jul. 31, 2009 in co-pending U.S. Appl. No. 11/006,440, 15 pages.
Examiner's Amendment and Reasons for Allowance mailed Sep. 3, 2009 in co-pending U.S. Appl. No. 11/006,440, 9 pages.
Response filed Jul. 21, 2008 in co-pending U.S. Appl. No. 11/006,446, 29 pages.
Final Office action mailed Oct. 28, 2008 in co-pending U.S. Appl. No. 11/006,446, 40 pages.
Response filed Dec. 29, 2008 in co-pending U.S. Appl. No. 11/006,446, 30 pages.
Advisory action mailed Jan. 7, 2009 in co-pending U.S. Appl. No. 11/006,446, 3 pages.
RCE and Amendment filed Apr. 28, 2009 in co-pending U.S. Appl. No. 11/006,446 33 pages.
Office action mailed Jul. 7, 2009 in co-pending U.S. Appl. No. 11/006,446, 32 pages.
Amendment filed Jul. 29, 2008 in co-pending U.S. Appl. No. 11/385,257, 26 pages.
Final Office action mailed Dec. 9, 2008 in co-pending U.S. Appl. No. 11/385,257, 35 pages.
RCE and Amendment filed May 11, 2009 in co-pending U.S. Appl. No. 11/385,257, 33 pages.
Supplemental Response filed May 26, 2009 in co-pending U.S. Appl. No. 11/385,257, 3 pages.
Notice of Non-Compliant Amendment mailed Jun. 1, 2009 in co-pending U.S. Appl. No. 11/385,257, 3 pages.
Response filed Jun. 30, 2009 in co-pending U.S. Appl. No. 11/385,257, 31 pages.
Office action mailed Sep. 14, 2009 in co-pending U.S. Appl. No. 11/385,257, 37 pages.
Office action mailed Nov. 12, 2008 in co-pending U.S. Appl. No. 11/319,758, 30 pages.
Amendment filed May 12, 2009 in co-pending U.S. Appl. No. 11/319,758, 35 pages.
Final Office action mailed Aug. 3, 2009 in co-pending U.S. Appl. No. 11/319,758, 35 pages.
Office action: Restriction Requirement mailed May 13, 2008 in co-pending U.S. Appl. No. 11/006,842, 5 pages.
Response to Restriction Requirement filed Aug. 13, 2008 in co-pending U.S. Appl. No. 11/006,842, 24 pages.
Office action mailed Nov. 3, 2008 in co-pending U.S. Appl. No. 11/006,842, 21 pages.
Response filed May 4, 2009 in co-pending U.S. Appl. No. 11/006,842, 35 pages.
Supplemental Response filed Jul. 17, 2009 in co-pending U.S. Appl. No. 11/006,842, 23 pages.
Notice of Allowance mailed Jul. 27, 2009 in co-pending U.S. Appl. No. 11/006,842, 13 pages.
Office action mailed Apr. 1, 2009 in co-pending U.S. Appl. No. 11/320,538, 18 pages.
Response filed Jul. 1, 2009 in co-pending U.S. Appl. No. 11/320,538, 26 pages.
Office action mailed May 27, 2009 in co-pending U.S. Appl. No. 11/361,500, 24 pages.
Response filed Aug. 27, 2009 in co-pending U.S. Appl. No. 11/361,500, 36 pages.
Amendment filed Aug. 1, 2008 in co-pending U.S. Appl. No. 11/412,417, 27 pages.
Final Office action mailed Nov. 13, 2008 in co-pending U.S. Appl. No. 11/412,417, 34 pages.
RCE and Amendment filed May 12, 2009 in co-pending U.S. Appl. No. 11/412,417, 31 pages.
Office action mailed Jun. 30, 2009 in co-pending U.S. Appl. No. 11/412,417, 34 pages.
Office action mailed Nov. 7, 2008 in co-pending U.S. Appl. No. 11/480,094, 19 pages.
Amendment filed May 7, 2009 in co-pending U.S. Appl. No. 11/480,094, 33 pages.
Final Office action mailed Jul. 28, 2009 in co-pending U.S. Appl. No. 11/480,094, 12 pages.
Johnston et al. Advances in Dataflow Programming Languages, ACM Computing Surveys, vol. 36, No. 1, pp. 1-34, 2004.
Navarro, "A Guided Tour to Approximate String Matching", ACM Computing Surveys, vol. 33, No. 1, pp. 31-88, 2001.
Reiss, "Semantics-Based Code Search", IEEE ICSE, pp. 243-253, 2009.
Talukdar, "Learning to Create Data-Integrating Queries", ACM PVLDB, pp. 785-796, 2008.
Examiner's Interview Summary mailed Oct. 27, 2009 in U.S. Appl. No. 11/005,859, 3 pages.
Amendment After Final filed Dec. 8, 2009 in U.S. Appl. No. 11/005,859, 87pages.
Amendment After Final filed Dec. 4, 2009 in U.S. Appl. No. 11/007,139, 25 pages.
Advisory action mailed Dec. 14, 2009 in U.S. Appl. No. 11/007,139, 4 pages.
Issue Notification mailed Oct. 28, 2009 in U.S. Appl. No. 11/006,848, 1 page.
Preliminary Amendment filed Dec. 21, 2009 in co-pending U.S. Appl. No. 12/573,829, 19 pages.
Letter re IDS considered by Examiner mailed Oct. 21, 2009 in U.S. Appl. No. 11/006,841, 5 pages.
Issue Notification mailed Nov. 11, 2009 in U.S. Appl. No. 11/006,841, 1 page.
Patent Application filed Oct. 13, 2009 in co-pending U.S. Appl. No. 12/578,411, 65 pages.
Letter re IDS considered by Examiner mailed Oct. 21, 2009 in U.S. Appl. No. 11/006,440, 5 pages.
Issue Fee filed Nov. 2, 2009 in U.S. Appl. No. 11/006,440, 12 pages.
Notice of Non-Compliant IDS mailed Nov. 12, 2009 in U.S. Appl. No. 11/006,440, 1 page.
Issue Notification mailed Dec. 2, 2009 in U.S. Appl. No. 11/006,440, 1 page.
Patent Application and Preliminary Amendment filed Nov. 30, 2009 in co-pending U.S. Appl. No. 12/627,816, 86 pages.
Examiner's Interview Summary mailed Oct. 26, 2009 in U.S. Appl. No. 11/006,446, 4 pages.
Response filed Dec. 7, 2009 in U.S. Appl. No. 11/006,446, 30 pages.
Letter re IDS considered by Examiner mailed Oct. 22, 2009 in U.S. Appl. No. 11/006,842, 1 page.
Issue Fee filed Oct. 27, 2009 in U.S. Appl. No. 11/006,842, 1 page.
Notice of Non-Compliant IDS mailed Nov. 3, 2009 in U.S. Appl. No. 11/006,842, 1 page.
Patent Application filed Nov. 5, 2009 in co-pending U.S. Appl. No. 12/613,450, 55 pages.
Final Office action mailed Nov. 2, 2009 in U.S. Appl. No. 11/320,538, 20 pages.
Notice of Allowance mailed Dec. 11, 2009 in U.S. Appl. No. 11/361,500, 14 pages.
Examiner's Interview Summary mailed Oct. 30, 2009 in U.S. Appl. No. 11/412,417, 3 pages.
Response filed Oct. 30, 2009 in U.S. Appl. No. 11/412,417, 30 pages.

Request for Continued Examination and Amendment filed Dec. 28, 2009 in U.S. Appl. No. 11/480,094, 36 pages.

U.S. Appl. No. 11/005,859 Advisory Action mailed Dec. 22, 2009, 2 pages.

U.S. Appl. No. 11/005,859: RCE with Amendment filed Jan. 7, 2010, 87 pages.

U.S. Appl. No. 11/005,859: Non-Final Office Action mailed Jan. 21, 2010, 17 pages.

U.S. Appl. No. 11/005,859: Response to Non-Final Office Action filed Feb. 25, 2010, 85 pages.

U.S. Appl. No. 11/005,859: Final Office Action mailed Jun. 8, 2010, 9 pages.

U.S. Appl. No. 11/007,139: RCE with amendment filed Jan. 4, 2010, 27 pages.

U.S. Appl. No. 11/007,139: Non-Final Office Action mailed Jan. 27, 2010, 31 pages.

U.S. Appl. No. 11/007,139: Response to Non-Final Office Action filed Apr. 27, 2010, 30 pages.

U.S. Appl. No. 12/573,829: Notice of Publication mailed Apr. 15, 2010, 1 page.

U.S. Appl. No. 12/573,829: Examiner's Search Strategy and Results dated Jun. 11, 2010, 1 page.

U.S. Appl. No. 12/573,829: Non-Final Office Action mailed Jun. 28, 2010 with Examiner Search Strategy and Results, 127 pages.

U.S. Appl. No. 12/578,411: Notice of Missing Parts mailed Oct. 28, 2009, 2 pages.

U.S. Appl. No. 12/578,411: Response to Missing Parts filed Dec. 28, 2009, 25 pages.

U.S. Appl. No. 12/578,411: Notice of Publication mailed Apr. 15, 2010, 1 page.

U.S. Appl. No. 12/627,816: Notice of Missing Parts mailed Dec. 15, 2009, 2 pages.

U.S. Appl. No. 12/627,816: Response to Missing Parts filed Apr. 12, 2010, 21 pages.

U.S. Appl. No. 11/006,446: Examiner Interview Summary mailed Mar. 19, 2010, 4 pages.

U.S. Appl. No. 11/006,446: Notice of Allowance/Allowability mailed Mar. 19, 2010, 29 pages.

Continuation Application in co-pending U.S. Appl. No. 12/573,829, 66 pages.

"Core Technology Benchmarks A White Paper", Jul. 2002, downloaded from the internet Mar. 2, 2004.

"Origin Data, Inc. White Paper", pp. 1-13., 1999.

"The Art of Computer Programming", vol. 1 Fundamental Algorithms, Second edition, Addison-Wesley Series in *Computer Science and Information Processing*, ISBN 0-201-03809-9, Reading, Massachusetts, Copyright 1973.

"The Associative Model of Data White Paper", Lazy Software, 2000.

Apostol, "A Centennial History of the Prime Number Theorem", Engineering and Science, No. 4, 1996.

Cano et al., "Lazy Evaluation in Penniless Propagation over Join Trees", Networks, vol. 39(4), 175-185, 2002.

Cooper et al., "*Oh! Pascal!*", 1982, pp. 295-327.

Er, M.C., "Enumerating Ordered Trees Lexicographically", Computation Journal, vol. 28, Issue 5, pp. 538-542, 1985.

Hoffman et al., "Pattern Matching in Trees", Jan. 1982, ACM Press, vol. 29, Issue 1, pp. 68-95.

Kharbutli et al., "Using Prime Numbers for Cache Indexing to Eliminate Conflict Misses", 24 pages.

Kilpelainen, "Tree Matching Problems with Applications to Structured Text Databases", Ph.D. Dissertation, Department of Computer Science, University of Helsinki, Report A-1992-6, Helsinki, Finland, pp. 1-109, Nov. 1992.

LeTourneau, "The Elementary Theory of Object Oriented Arithmetic", pp. 1-9, Apr. 1990.

Neven, Frank and Thomas Schwentick, "Expressive and efficient pattern languages for tree-structured data" Proceedings of the Nineteenth ACM SIGACT-SIGMOD-SIGART Symposium on Principles of Database Systems, May 2000.

Shanmugasundaram et al., "Querying SML Views of Relational Data", Proceedings of the 27$^{th}$ VLDB Conference, Roma, Italy, 2001.

Sitaraman, Krishna, Ranganathan, N., and Ejnioui, Abdel, "A VLSI Architecture for Object Recognition using Tree Matching" Proceedings of the IEEE International Conference on Application-Specific Systems, Architectures, and Processors (ASAP'02) 2000.

Smorynski, Craig, "Logical Number Theory I: An Introduction", Springer-Verlag, 1991, pp. 14-23, and 305.

Somani et al., "Phased-Mission System Analysis Using Boolean Algebraic Methods", May 1994, ACM Press, vol. 22, Issue 1.

Stanat, D.F., and McAllister, D.F., "Discrete Mathematics in Computer Science", Prentice-Hall, 1977, Section 3.2, Trees, p. 131-145.

Valiente, "Algorithms on Trees and Graphs", pp. 151-251, Springer 2002.

Valiente, Gabriel, Chapter 4, "Tree Isomorphism," of Algorithms on Trees and Graphs, published by Springer, 2002.

Zaks, S., "Lexicographic Generation of Ordered Trees", The Journal of Theoretical Computer Science, vol. 10(1), pp. 63-82, 1980.

Co-pending U.S. Appl. No. 11/319,758, filed Dec. 2005.

Co-pending U.S. Appl. No. 11/320,538, filed Dec. 2005.

Co-pending U.S. Appl. No. 11/480,094, filed Jun. 2006.

U.S. Appl. No. 11/006,446: Issue Fee Payment and 312 Amendment filed Jun. 21, 2010, 23 pages.

U.S. Appl. No. 12/830,236: Divisional Application filed Jul. 2, 2010, 103 pages.

U.S. Appl. No. 11/385,257: Response to Non-Final Office Action filed Jan. 13, 2010, 34 pages.

U.S. Appl. No. 11/385,257: Final Office Action mailed Apr. 12, 2010, 47 pages.

U.S. Appl. No. 11/319,758: RCE filed Jan. 4, 2010, 45 pages.

U.S. Appl No. 11/319,758: Non-Final Office Action mailed Mar. 30, 2010, 39 pages.

U.S. Appl. No. 12/613,450: Notice of Missing Parts mailed Nov. 18, 2009, 2 pages.

U.S. Appl. No. 12/613,450: Preliminary Amendment and Response to Missing Parts filed Jan. 19, 2010, 16 pages.

U.S. Appl. No. 11/320,538: Response to Final Office Action filed Jan. 4, 2010, 23 pages.

U.S. Appl. No. 11/320,538: Advisory Action mailed Jan. 19, 2010, 3 pages.

U.S. Appl. No. 11/320,538: RCE and Amendment filed Apr. 2, 2010, 26 pages.

U.S. Appl. No. 11/320,538: Non-Final Office Action mailed Jun. 9, 2010, 24 pages.

U.S. Appl. No. 12/702,243: Continuation Application with Preliminary Amendment filed Feb. 8, 2010, 83 pages.

U.S. Appl. No. 12/702,243: Notice of Missing Parts mailed Feb. 25, 2010, 2 pages.

U.S. Appl. No. 12/702,243: Response to Missing Parts filed Apr. 26, 2010, 8 pages.

U.S. Appl. No. 11/412,417: Final Office Action mailed Jan. 4, 2010, 37 pages.

U.S. Appl. No. 11/412,417: RCE with Amendment filed May 4, 2010, 27 pages.

Apostol, "A Centennial History of the Prime Number Theorem", Engineering and Science, No. 4, 1996.

Cano et al., "Lazy Evaluation in Penniless Propagation over Join Trees", Networks, vol. 39(4), 175-185, 2002.

Cooper et al., "Oh! Pascal!", 1982, pp. 295-327.

Er, M.C., "Enumerating Ordered Trees Lexicographically", Computation Journal, vol. 28, Issue 5, pp. 538-542, 1985.

Hoffman et al., "Pattern Matching in Trees", January 1982, ACM Press, vol. 29, Issue 1, pp. 68-95.

Kharbutli et al., "Using Prime Numbers for Cache Indexing to Eliminate Conflict Misses", 24 pages.

Kilpelainen, "Tree Matching Problems with Applications to Structured Text Databases", Ph.D. Dissertation, Department of Computer Science, University of Helsinki, Report A-1992-6, Helsinki, Findland, pp.1-109, Nov. 1992.

Letourneau, "The Elementary Theory of Object Oriented Arithmetic", pp. 1-9, Apr. 1990.

Neven, Frank and Thomas Schwentick, "Expressive and efficient pattern languages for tree-structured data" Proceedings of the Nineteenth ACM Sigact-Sigmod-Sigart Symposium on Principles of Database Systems, May 2000.

Shanmugasundaram et al., "Querying SMLViews of Relational Data", Proceedings of the 27$^{th}$ VLDB Conference, Roma, Italy, 2001.

Sitaraman, Krishna, Ranganathan, N., and Ejnioui, Abdel, "A VLSI Architecture for Object Recognition using Tree Matching" Proceedings of the IEEE International Conference on Application-Specific Systems, Architectures, and Processors (ASAP'02) 2000.

Smorynski, Craig, "Logical Number Theory I: An Introduction", Springer-Verlag, 1991, pp.14-23, and 305.

Somani et al., "Phased-Mission System Analysis Using Boolean Algebraic Methods", May 1994, ACM Press, vol. 22, Issue 1.

Stanat, D.F., and McAllister, D.F., "Discrete Mathematics in Computer Science", Prentice-Hall, 1977, Section 3.2, Trees, p. 131-145.

Valiente, "Algorithms on Trees and Graphs", pp. 151-251, Springer 2002.

Valiente, Gabriel, Chapter 4, "Tree Isomorphism," of Algorithms on Trees and Graphs, published by Springer, 2002.

Zaks, S., "Lexicographic Generation of Ordered Trees", The Journal of Theoretical Computer Science, vol. 10(1), pp. 63-82, 1980.

Office action: Restriction Requirement in co-pending U.S. Appl. No.11/005,859, dated Dec. 12, 2007.

Response to Restriction Requirement in co-pending U.S. Appl. No. 11/005,859, dated Jan. 14, 2008.

Non-Final OA in co-pending U.S. Appl. No. 11/005,859, dated Mar. 21, 2008.

Preliminary Amendment in co-pending U.S. Appl. No. 11/007,139, dated Apr. 28, 2005.

Non-Final OA issued in co-pending pending U.S. Appl. No. 11/007,139 dated May 14, 2007.

Response to Non-Final OA in co-pending U.S. Appl. No. 11/007,139 dated Oct. 15, 2007.

Supplemental Amendment in co-pending U.S. Appl. No. 11/007,139 dated Oct. 17, 2007.

Non-Final OA issued in co-pending U.S. Appl. No. 11/007,139 dated Jan. 2, 2008.

Response to Non-Final OA in co-pending U.S. Appl. No. 11/007,139 dated Apr. 2, 2008.

Non-Final OA issued in co-pending U.S. Appl. No. 11/006,848 dated Apr. 4, 2007.

Response to Non-Final OA in co-pending U.S. Appl. No. 11/006,848, dated Oct. 3, 2007.

Supplemental Amendment in co-pending U.S. Appl. No. 11/006,848, dated Nov. 13, 2007.

Non-Final OA issued in co-pending U.S. Appl. No. 11/006,848, dated Feb. 5, 2008.

Non-Final OA issued in co-pending U.S. Appl. No. 11/006,841, dated Apr. 6, 2007.

Response to Non-Final OA in co-pending U.S. Appl. No. 11/006,841, dated Sep. 6, 2007.

Office Action: Restriction Requirement in co-pending U.S. Appl. No. 11/006,841, dated Nov. 27, 2007.

Response to Restriction Requirement in co-pending U.S. Appl. No. 11/006,841, dated Dec. 27, 2007.

Office Action: Restriction Requirement in co-pending U.S. Appl. No. 11/006,841, dated Mar. 17, 2008.

Preliminary Amendment in co-pending U.S. Appl. No. 11/006,440 dated Apr. 28, 2005.

Preliminary Amendment and Substitute Specification in co-pending U.S. Appl. No. 11/006,440 dated Oct. 5, 2006.

Office Action: Restriction Requirement in co-pending U.S. Appl. No. 11/006,440 dated Mar. 29, 2007.

Response to Restriction Requirement in co-pending aU.S. Appl. No. 11/006,440 dated Apr. 31, 2007.

Non-Final OA issued in co-pending U.S. Appl. No. 11/006,440 dated Jun. 21, 2007.

Response to Non-Final OA in co-pending U.S. Appl. No. 11/006,440 dated Nov. 20, 2007.

Final OA issued in co-pending U.S. Appl. No. 11/006,440 dated Feb. 6, 2008.

Response to Final OA in co-pending U.S. Appl. No. 11/006,440 dated Apr. 7, 2008.

Preliminary Amendment in co-pending U.S. Appl. No. 11/006,446, dated Apr. 28, 2005.

Office Action: Restriction Requirement in co-pending U.S. Appl. No. 11/006,446, dated Apr. 4, 2007.

Response to Restriction Requirement in co-pending U.S. Appl. No. 11/006,446, dated May 3, 2007.

Non-Final OA issued in co-pending U.S. Appl. No. 11/006,446, dated Jul. 26, 2007.

Response to Non-Final OA in co-pending U.S. Appl. No. 11/006,446, dated Nov. 26, 2007.

Non-Final OA issued in co-pending U.S. Appl. No. 11/006,446, dated Feb. 20, 2008.

Office Action: Restriction Requirement in co-pending U.S. Appl. No. 11/006,842, dated Jan. 23, 2008.

Response to Restriction Requirement in co-pending U.S. Appl. No. 11/006,842, dated Feb. 25, 2008.

Office Action: Restriction Requirement in co-pending U.S. Appl. No. 11/412,417, dated Apr. 1, 2008.

Non-Final OA issued in co-pending U.S. Appl. No. 11/385,257, dated Apr. 29, 2008.

Advisory Action issued in co-pending U.S. Appl. No. 11/006,440 dated May 9, 2008.

Preliminary Amendment in co-pending U.S. Appl. No. 11/005,859, dated May 2, 2005.

Preliminary Amendment in co-pending U.S. Appl. No. 11/006,848, dated May 3, 2005.

* cited by examiner

Fig. 1

| NN | FMS(NN) | FMS(FMS(NN)) | FMS(...FMS(FMS(FMS(NN)))...) |
|---|---|---|---|
| 0 | { } | { } | { } |
| 1 | {0} | {{}} | {{}} |
| 2 | {0, 0} | {{}{}} | {{}{}} |
| 3 | {1} | {{0}} | {{{}}} |
| 4 | {0, 0, 0} | {{}{}{}} | {{}{}{}} |
| 5 | {2} | {{0, 0}} | {{{}{}}} |
| 6 | {0, 1} | {{}{{}}} | {{}{{}}} |
| 7 | {3} | {{1}} | {{{{}}}} |
| 8 | {0, 0, 0, 0} | {{}{}{}{}} | {{}{}{}{}} |
| 9 | {1, 1} | {{0}{0}} | {{{}}{{}}} |
| 10 | {0, 2} | {{}{0, 0}} | {{}{{}{}}} |
| 11 | {4} | {{0, 0, 0}} | {{{}{}{}}} |
| 12 | {0, 0, 1} | {{}{}{0}} | {{}{}{{}}} |
| 13 | {5} | {{2}} | {{{{}{}}}} |
| 14 | {0, 3} | {{}{1}} | {{}{{{}}}} |
| 15 | {1, 2} | {{0}{0, 0}} | {{{}}{{}{}}} |
| 16 | {0, 0, 0, 0, 0} | {{}{}{}{}{}} | {{}{}{}{}{}} |
| 17 | {6} | {{0, 1}} | {{{}{{}}}} |

*Fig. 2*

| NN | Strings | Data Structures |
|---|---|---|
| 0 | { } | |
| 1 | {0} | [0,0] |
| 2 | {0, 0} | [0,1] |
| 3 | {1} | [1,1] |
| 4 | {0, 0, 0} | [0,2] |
| 5 | {2} | [2,1] |
| 6 | {0, 1} | [0,3], [1,2] |
| 7 | {3} | [3,1] |
| 8 | {0, 0, 0, 0} | [0,4] |
| 9 | {1, 1} | [1,3] |
| 10 | {0, 2} | [0,5], [2,1] |
| 11 | {4} | [4,1] |
| 12 | {0, 0, 1} | [0,6], [1,4] |
| 13 | {5} | [5,1] |
| 14 | {0, 3} | [0,7], [3,1] |
| 15 | {1, 2} | [1,5], [2,3] |
| 16 | {0, 0, 0, 0, 0} | [0,8] |
| 17 | {6} | [6,1] |

FILE LOCATION NAMING HIERARCHY

This disclosure claims priority pursuant to 35 USC 119(e) from U.S. provisional patent application Ser. No. 60/584,734, filed on Jun. 30, 2004, by J. J. LeTourneau, titled, "FILE LOCATION NAMING HIERARCHY," assigned to the assignee of the presently claimed subject matter.

BACKGROUND

This disclosure is related techniques for naming file locations, such as for a file location naming hierarchy.

In a variety of fields, data or a set of data, may be represented in a hierarchical fashion. This form of representation may, for example, convey information, such as particular relationships or patterns between particular pieces of data or groups of data and the like. However, manipulating and/or even recognizing specific data representations or patterns is not straight-forward, particularly where the data is arranged in a complex hierarchy. Without loss of generality, one example may include a database, such as a relationship database. Typically, a relational database includes files arranging in a file naming hierarchy that provides location information so that the file may be accessed. Techniques for manipulating files, defining relationships among files and/or moving between files in such a hierarchy continue to be desirable.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

DETAILED DESCRIPTION

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's memories, registers, and/or other information storage, transmission, and/or display devices.

In a variety of fields, data or a set of data, may be represented in a hierarchical fashion. This form of representation, may, for example, convey information, such as particular relationships or patterns between particular pieces of data or groups of data and the like. However, manipulating and/or even recognizing specific data representations or patterns is not straight-forward, particularly where the data is arranged in a complex hierarchy. Without loss of generality, one example may include a database, such as a relationship database. Typically, a relational database includes files arranging in a file naming hierarchy that provides location information so that the file may be accessed. Techniques for manipulating files, defining relationships among files and/or moving between files in such a hierarchy continue to be desirable. In this context, the term file refers to any stored collection of data that is segregated or partitioned in some manner, such as, for example, audio data, video data, computer code, text, etc.

In this context, a location naming hierarchy refers to a technique of method of naming a location in which data is stored or to be stored, including, but not necessarily limited to including, a collection of operations to be performed upon those named locations that, if performed upon the location names, performs operations on the data stored in those named locations to produce another set of data that may be stored in another named location. One example of a location naming hierarchy commonly used is the "Unix" file hierarchy. As is well-known, in the Unix hierarchy, a particular file may have a name for an associated location that comprises a collection of finite character sequences, such as, for example, the file name "/A/B/C/***/Z", in which, for this example, A, B, C, etc. comprise file names in the form of finite sequences. For the purposes of simplification of discussion, it is appropriate to think of a sequence of characters as a finite sequence of natural numerals. Thus, for example, a technique, such as a look up table, may be employed to convert between finite sequences of natural numerals and finite sequences of characters. This may be employed, for example, in a computer or computing system in which the computer or computing system performs the conversion. Likewise, in addition, the natural numerals may likewise be converted to binary numerals so that they may be operated upon by the computer or computing system, although this level of detail is well-understood and need not be discussed further. Likewise, for the purposes of this discussion, the character "/" may be replaced by a comma and, therefore, the file name above, for example, may be represented as the following character string <A, B, C, * * * Z,>. These changes in nomenclature are primarily for purposes of convenience and to simplify the discussion. One of ordinary skilled in the art will appreciate that there is no loss of generality by making these substitutions.

Figure 1:
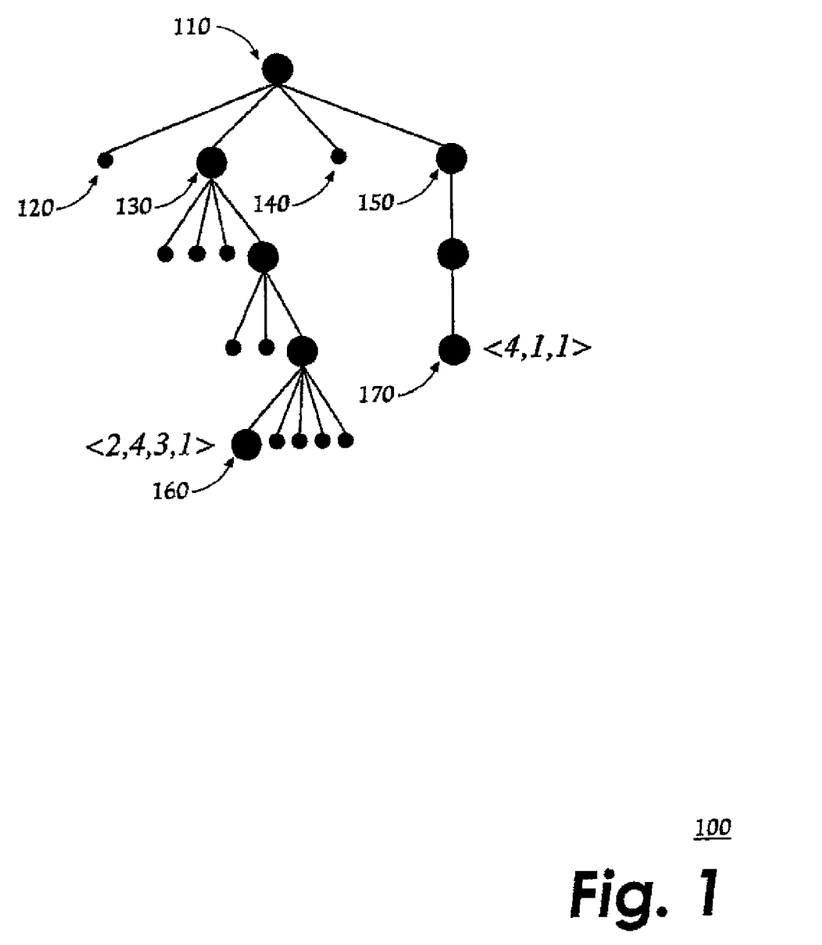
FIG. 1 is a tree diagram illustrating an embodiment of a file location naming hierarchy.

With this understanding, reference is now made to FIG. 1. FIG. 1 depicts a tree intended to convey, in graphical form, a potential embodiment of a location naming hierarchy (hereinafter referred to as "hierarchy"), such as one that may be employed in a Unix-based system. In this context, the term "Unix" or "Unix-based system" generally refers to a computing system or a computer system in which the Unix operating system or a version of the Unix operating system is employed. Of course, it is likewise noted that the file structure described above is also common in other operating systems other than a Unix based system, such as where other characters separate finite sequences, etc.

Referring now to FIG. 1, as illustrated, the tree includes a root node, designated 110 in FIG. 1. For the purposes of this discussion, the root node is referred to as being at "level 0". Thus, here, level 0 has a single node, the root node. In FIG. 1, directly emanating from the root node are four nodes on a level referred to in this context as "level 1." For the purposes of designation in a Unix-based operating system, from the prior discussion, the nodes on this level may be designated respectively as 1, 2, 3, and 4. Thus, in FIG. 1, node 1 has reference numeral 120, node 2 has reference 130, node three has reference numeral 140, and node 4 has reference numeral 150. Continuing with this approach, for this example, there is a level 2, a level 3, and a level 4. The level 2 includes five nodes, which may be referred to in a Unix-based operating system as 1, 2, 3, 4, and 5, respectively. The level 3 includes four nodes referred to here as 1, 2, 3, and 4, respectively, and the level 4 includes five nodes referred to here as 1, 2, 3, 4, and 5, respectively.

As illustrated in FIG. 1, therefore, a file represented in the tree as a node, using the nomenclature previously described, may be stored in a location named <2, 4, 3, 1>, as shown in FIG. 1 with reference numeral 160. Likewise, the node that is, in this example, the file with the reference numeral 170 has a standard Unix-based operating system designation or location name of <4, 1, 1>. Thus, as is clear, from the prior discussion, each of these nodes, in this example, represents a particular file having designations or named locations in memory typical of the Unix-based operating system. Tree 100 in FIG. 1, therefore, is a graphical illustration of the file hierarchy for this particular embodiment.

Although the scope of the claimed subject matter is not limited in the following respect, a significant portion of data that is typically stored in connection with a computer system or a computing system is stored on a device or on devices conventionally referred to as a "hard drive" or on some other storage medium in which the data is typically accessed in a serial fashion. This is in contrast to memory conventionally referred to as Random Access Memory or RAM, in which the data may typically be accessed in a non-serial fashion. Thus, for a memory system in which data is accessed serially, such as a hard drive, as an example, accessing files is typically more time consuming than accessing data using RAM or Random Access Memory. A hard drive, for example, typically locates the position of a desired file on the disk of the hard drive to access the particular file. Thus, accessing a file involves finding the location of the particular file and then aligning the file location with a device that is capable of reading the stored data from that location. In comparison, for accessing data stored in RAM, the locations are, in essence, substantially simultaneously or equivalently accessible. Thus, accessing data from RAM typically takes less time at least in part because it does not involve locating the file and aligning that location with a device capable of reading the stored data. All or most locations in RAM are typically capable of being read. Thus, a file may be accessed once it is known which one is desired.

An aspect of knowing the location of a particular named file on a disk, for example, of a computing system employing a Unix-based operating system, involves knowing the positional relationship of a particular file to other files stored on the disk. Thus, for example, if a particular program is executing or operating in which, initially, the file named or designated in FIG. 1 as <2, 4, 3, 1> is accessed and, in succession, the file named or designated as <4, 1, 1> is accessed, the operating system, in essence, traces file locations based at least in part on the naming convention employed, in this example by moving up the particular file hierarchy in memory, here along a branch from the bottom node, designated by reference 160 in FIG. 1, back to the root node designated 110 in FIG. 1, and then along another branch from root node 110 to node 170. In other words, in a Unix-based operating system, the "linear" relationship of the names of the particular files at each of the levels of the hierarchy or structure provides a mechanism to move between files in memory based at least in part on the particular hierarchy. This particular approach to finding the location of named files to be accessed serially may be time consuming. Of course, in this particular context, the frame of reference for the term "time consuming" may change as technology advances. For example, in one frame of reference, time consuming may refer a relatively short time in comparison to seconds, but a relatively long timing in comparison to the speed of, for example, a state-of-the-art RAM. However, again, such frames of reference may be subject to change.

It is likewise noted that an alternative approach to the one just described may include maintaining the positional relationship between every file to every other file. A disadvantage, however, to this approach is that as the number of files increase, maintaining and using this amount of information effectively may become intractable.

An embodiment of a method of arranging files in file hierarchy will now be discussed in which the relationship among files is such that moving between files in the hierarchy is typically less time consuming than the approach just discussed above in connection with a Unix-based operating system. In this particular embodiment, the file structure or hierarchy is based, at least in part, on a location naming convention described in this context as employing finite multi-sets of natural numerals. In comparison, as alluded to by previously, the file structure or hierarchy employed in a Unix-based operating system is based, at least in part, on a location naming convention described in this context as employing finite sequences of natural numerals. As shall be explained in more detail below, in this particular context, a finite sequence refers to a collection of a finite number of elements indexed by the natural numbers. Likewise, in this particular context, a finite multi-set refers to an unordered collection of a finite number of elements. It is noted that the term collection includes situations in which elements are repeated. Thus, whereas for a finite sequence, the order or indexing of the arrangement of elements, for this embodiment, here, natural numerals, is an aspect of the naming convention, as well as the multiplicity or repetition of particular elements; in contrast, for a finite multi-set, the multiplicity or repetition is an aspect of the naming convention, but the order or indexing of the elements is not.

Figure 2:
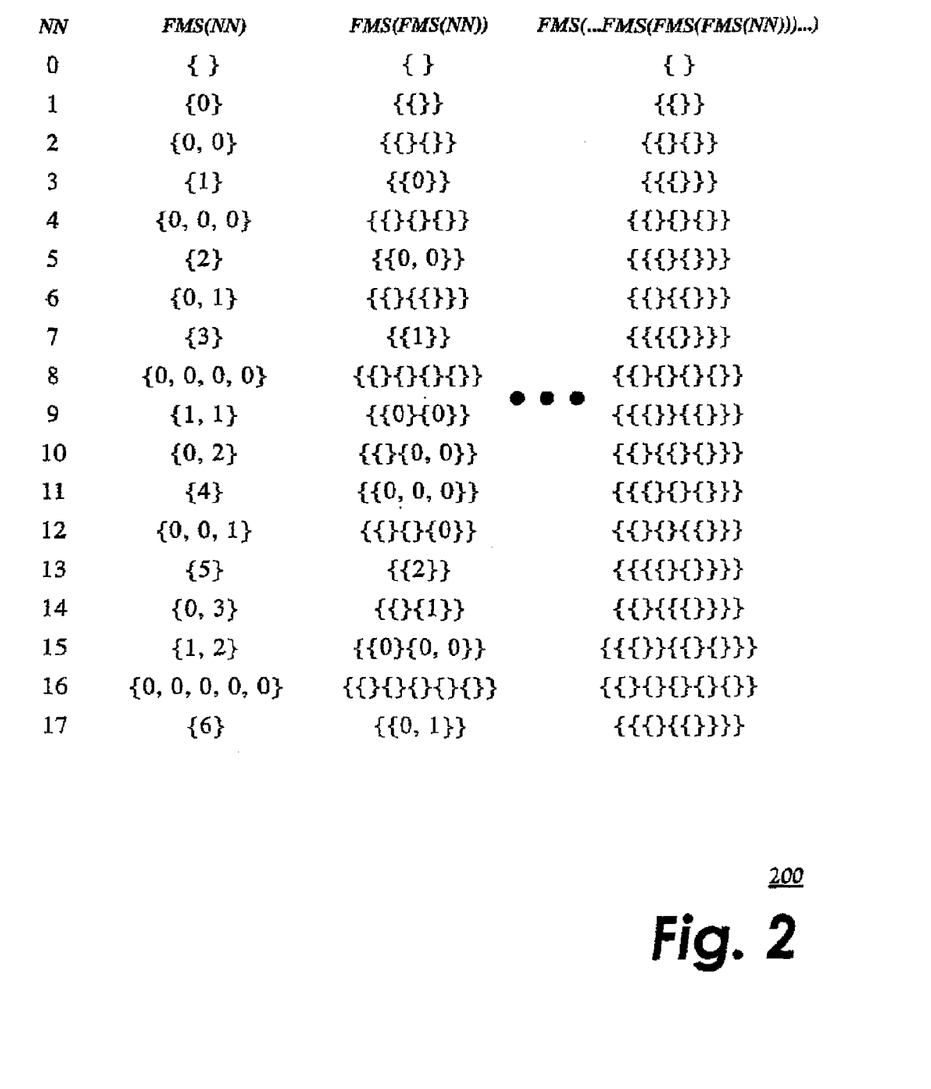
FIG. 2 is a table illustrating an embodiment of names and relationships for an embodiment of a file location naming hierarchy.

For this particular embodiment, FIG. 2 shows a table containing four columns; however, the ellipse in FIG. 2 is intended here to indicate a table of an unspecified number of total columns. As is apparent from FIG. 2, the first column contains the natural numerals in an ascending order. Likewise, as shall be explained in more detail hereinafter, the second column contains the finite multi-sets of the natural numerals, each finite multi-set set corresponding to a natural numeral for this particular embodiment. More specifically, using, for this embodiment, particular rules or principles of construction, the second column has, as its elements, all possible finite multi-sets created based on the natural numerals. These finite multi-sets corresponding to natural numerals, here, are referred to in this context as finite multi-sets or FMS, for convenience.

To construct the second column, for this particular embodiment, a specific technique is employed to construct the multi-set of the natural numerals. Of course, the claimed subject matter is not limited in scope to this particular embodiment and, in particular, is not limited in scope to this particular technique or these rules of construction. Thus, other rules or other approaches to constructing or creating a file hierarchy naming convention using a multi-set of the natural numerals, for example, may be employed and still remain within the scope of the claimed subject matter. Nonetheless, as suggested above, for this particular embodiment, a particular finite multi-set is associated with each natural numeral. As will be demonstrated, by repetitively applying these rules of construction, multi-sets of multi-sets shall be created, as explained in more detail hereinafter.

Thus, for the natural numeral, zero, for example, the empty set { } is associated, for this embodiment, as illustrated in column two, along the row that contains zero in the first column. Likewise, for the natural numeral, 1 of column one, the set {0} of column two is associated, which may also be referred to here as "singleton zero." For the natural numeral, 2, the finite multi-sets {0, 0} is associated, which may be referred to here as "doubleton zero." Thus, in this particular embodiment, although the claimed subject matter is not limited in scope in this respect, the natural numeral zero is associated with the simplest multi-set. The natural number one is associated with the next simplest multi-set, etc.

It is noted that the natural numeral 2 is the only even non-composite numeral for this particular embodiment. An approach or rule for constructing a finite multi-set associated with an odd non-composite numerals is as follows, for this embodiment. For any natural numeral k, in which k is an odd non-composite numeral, a singleton set {i} is associated with it, in which i is the index of the non-composite numeral in the well-known Kleene enumeration. For example, the set associated with natural numeral 3 is {1}. The set associated with natural numeral 5 is {2}. The set associated with natural numeral 7 is {3}, etc.

The remaining rules refer to forming a finite multi-set associated with a natural numeral from the prior finite multi-sets associated with the natural numerals. For example, any even composite natural numeral may be expressed as 2k, in which k is a prior natural numeral such that an associated finite multi-set has been defined, such as above. The finite multi-set of 2k, here is formed from a union of the finite multi-set associated with k and the finite multi-set {0}. Likewise, any odd composite numeral, k*L, has associated with it the multi-set that is formed from the union of the multi-sets associated with k and L, respectively, for this embodiment. Thus, for this particular embodiment, although the claimed subject matter is not limited in scope in this respect, merger of the index of non-composite natural numerals corresponds to conventional multiplication.

Returning to FIG. 2, the set associated with the natural numeral 4 is a set that includes three zeros {0, 0, 0}—the merger of the set associated with 2 with the set {0}, as explained above. Likewise, the set associated with the natural numeral 8 comprises four zeros {0, 0, 0, 0} and so forth. Furthermore, the set associated with 6 is the merger of the set associated with 3, here {1}, with the set that contains one zero {0}.

Continuing to column three of FIG. 2, its' elements comprise the finite multi-sets of column two. Column three, here, is constructed by applying the rules described above to column two. Likewise, the rules applied to column three construct column four, etc. It is also noted that an alternate way to move from one column to another column is to substitute the natural numerals in the column with their associated set from column two. Thus, for example, for natural numeral 7, its element in the third column may be constructed from the second column by replacing 3, which is along the same row, with its associated set {1}. Likewise to move from column three to column four along the same row, the natural numeral 1 in {1} is replaced with its associated set {0} to produce {{0}} and so forth.

Although the claimed subject matter is not limited in scope in this respect, this ability to move between columns and, hence, between multi-sets, may provide advantages in certain environments. It allows the potential for inter-related file structures. For example, in some situations, it may be desirable to run multiple tasks using related file structures. Computer science has many examples where this may occur, such as with databases, computer programs, look ahead operations, etc. Thus, an embodiment in which the file structures employs an approach similar to that just described, for example, provides the ability to move between files created as part of performing such disparate but related tasks, quickly and easily. Depending upon the particular situation, it may simply comprise moving between columns in a file structure, such as the file structure embodiment above, for example.

The previously described approach for constructing multi-sets for the natural numerals, here column two, provides a technique for associating a natural numeral, here column one, with a finite multi-set in which the elements of the set are the natural numerals. It may be convenient to view a finite multi-set as a string for the purposes of implementation on a computing device, such as a computer, for example. As will be explained in more detail hereinafter, this association may be usefully employed in a variety of contexts, such as, for this embodiment, to construct a file hierarchy, for example.

In this particular embodiment in which a table, such as that illustrated in FIG. 2, is employed to create a file hierarchy, file names are employed that comprise multi-sets. In this particular embodiment, the multi-set is related to the number of columns to be constructed. In this context, the term "multi-set depth" indicates that the file names are taken from a particular column such as if the columns are constructed as previously described, up to a particular column. For example, if the multi-set depth is 6, ultimately, for this embodiment, it will be desirable to construct the seventh column for this particular embodiment, as explained in more detail hereinafter. As may be observed, for this embodiment, column two in FIG. 2 has a multi-set depth of 1. For this example, therefore, it is desirable to construct columns corresponding to depths of 6, 5, 4, 3, 2 and 1, and also to construct a K+1 or seventh column that corresponds to the multi-set depth of K, here K being 6 to correspond to a multi-set depth of 6. By constructing a column of multi-set depth 6, here column 7, a column has been created in which the file names employed in this column is related to the file names in the other prior columns along a corresponding row, for example, although, of course, the claimed subject matter is not limited in scope in this respect.

By this construction, the multi-set file names desired to be employed may be related to natural numerals by moving between the K+1 column and the first column. This, therefore, permits movement between hierarchical file names in a process that may be implemented, for example, by, for this embodiment, moving between columns and up and down rows. Such an approach, thus, may be more efficient than the approach previously described in connection with the Unix-based operating system at least in part because it permits direct movement between two files rather than tracing branches of a tree, as previously described. It is likewise noted that the multi-set depth, or the column from which a particular file name was selected, may be determined "on the fly," in this embodiment, by the number of sets of parentheses in the file name. Of course, the claimed subject matter is not limited to employing parentheses and, thus, other techniques to make such a determination on the fly are also possible and included within the scope of the claimed subject matter. However, as noted, for a particular file name, its row and column location may be determined from the name so that the operations described above may be quickly and easily implemented if such a file structure or a similar file structure is employed.

Of course, techniques for performing table look-ups are well-known and well-understood. Thus, this will not be discussed in detail here. However, it shall be appreciated that any and all of the previously described and/or later described processing, operations, conversions, transformations, manipulations, etc. of strings, trees, numerals, data, etc. may be performed on one or more computing platforms or similar computing devices, such as those that may include a memory to store a table as just described, although, the claimed subject matter is not necessarily limited in scope to this particular approach. Thus, for example, a hierarchy of data, such as a tree as previously described, for example, may be formed. Likewise, operations and/or manipulations, as described, may be performed; however, operations and/or manipulations in addition to those described or instead of those described may also be applied. It is intended that the claimed subject matter cover all such embodiments.

For this particular embodiment, although the claimed subject matter is not limited in scope in this respect, the files may be arranged in a naming hierarchy in which the hierarchy is constructed by recursively forming multi-sets of a set of elements. In this particular embodiment, for example, the set of elements may comprise the finite multi-set of natural numerals, although, again the claimed subject matter is not limited in scope in this respect. Recursively forming of multi-sets may, therefore, create a naming hierarchy for files, such as just described for this particular embodiment. In this context, recursively forming multi-sets may also be referred to as compound multi-sets.

Figure 3:
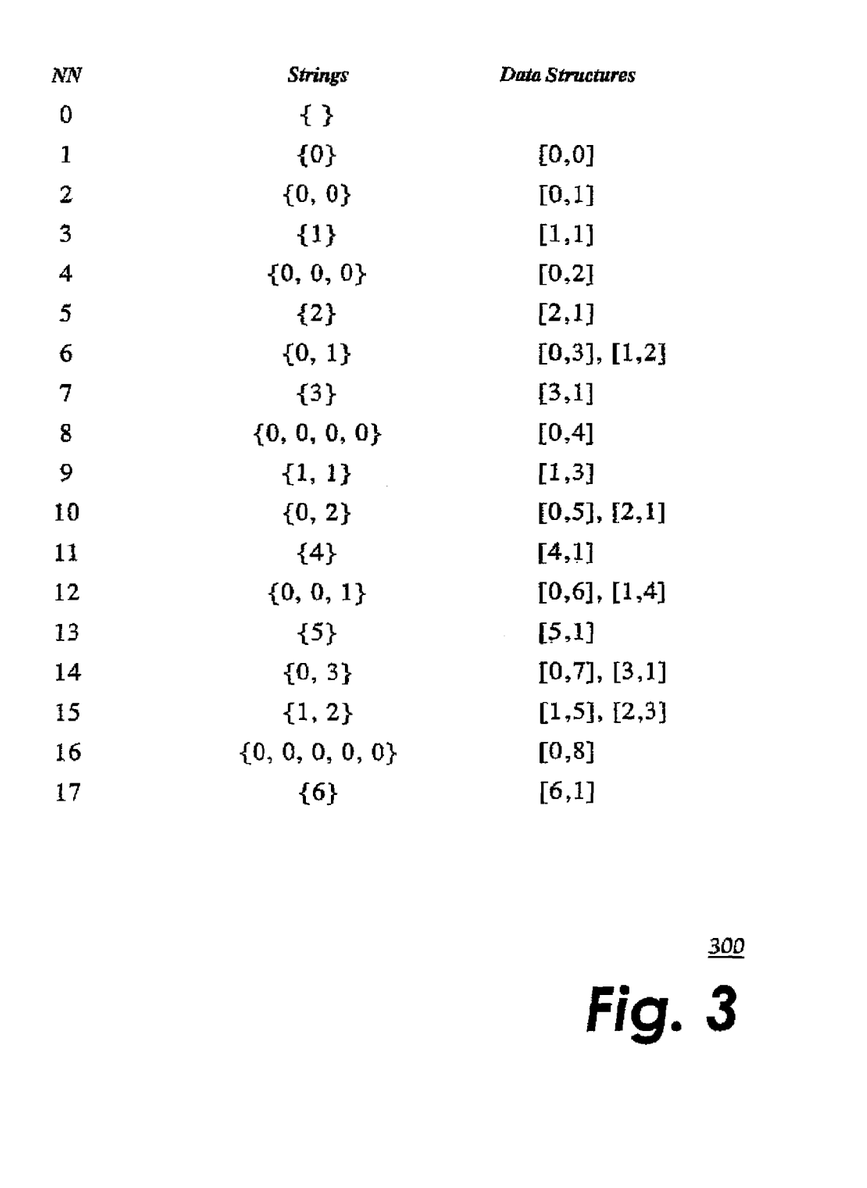
FIG. 3 is a table illustrating another embodiment of names and relationships for an embodiment of a file location naming hierarchy.

FIG. 3 illustrates another embodiment of a table in accordance with the claimed subject matter. As is apparent from inspection, the first two columns of the table of FIG. 2, correspond to the first two columns of the table of FIG. 3, although, again, the claimed subject matter is not limited in scope in this respect. Column one of FIG. 3, therefore, also contains natural numerals in ascending order and column two of FIG. 3 also contains corresponding finite multi-sets, as previously described. Column three of FIG. 3, however, for this embodiment, contains numeral pairs, as shall be described in more detail hereinafter.

In this particular embodiment, natural numerals of column one are related to numeral pairs of column three, as described in more detail below. One numeral of the numeral pair contains the index numeral for an associated non-composite numeral, such as previously described in connection with the Kleene enumeration. For example, as previously described, for the natural numeral 3, the index associated is 1. Likewise, for the natural numeral 5, the index associated is 2. For the natural numeral 7, the index associated is 3, etc.

The other numeral of the numeral pair, for this embodiment, comprises the numeral that produces the natural numeral of column one when multiplied by the non-composite numeral corresponding to the index of the Kleene enumeration. Again, using the natural numeral 3 of column one as an example, one numeral of the numeral pair is 1, as previously described. Thus, the other numeral of the numeral pair is also 1. More particularly, 1 times the non-composite numeral, for this example, 3, produces the natural numeral, again in this example 3. A more helpful may be the natural numeral 6 of column one. Here, the index may be either a 1 or a 0, as explained in more detail hereinafter. If the index is 1, the other natural numeral of the numeral pair is 2, that is, 3 (corresponding to 1) times 2 is 6. If, instead, the index is 0, the other numeral is 3 since 2 (corresponding to 0) times 3 is also 6.

As may now be appreciated, column three, in this embodiment, provides a mechanism to identify those natural numerals of column one that are non-composite. In particular, the first numeral is the index described previously, and the second numeral is the numeral that produces the natural numeral of column one, if multiplied by the non-composite numeral corresponding to the index. Thus, for this embodiment, numeral pairs in which the second numeral is 1 correspond to those natural numerals in column one that are non-composite. It is, again, appreciated that the claimed subject matter is not limited in scope to this particular embodiment. For example, the numerals may not be arranged in columns and/or the numeral pair may be reversed. Likewise, instead of a numeral pair in one column, perhaps two columns, each having a numeral may be employed. In the latter approach, for example, finding a one numeral in the column will identify the non-composite numerals. Many different approaches and/or embodiments may be employed; however, it is intended that they all be included within the scope of the claimed subject matter. For this embodiment, the numeral pairs in column three comprise a first operation in a factorization of the natural numeral in column one. Hence, for non-composite numerals, the identified numeral will be 1, whereas for other natural numerals that are not non-composite, this particular numeral will be something other than 1.

Column three, in this particular embodiment, also provides a mechanism through which it is possible to represent a natural numeral using fewer bits than an associated conventional binary representation. Consider, for example, the natural numeral 9. To represent 9 in a binary representation employs four bits, as is well-known. However, the column three representation of the natural numeral 9 is the numeral pair [1, 3], in this particular embodiment. To represent the natural numeral 1 employs one bit. To represent the natural numeral 3 employs two bits. Therefore, by substituting the pair [1, 3] in memory for 9, for example, three bits may be employed to represent the natural numeral 9, whereas conventionally it takes four bits. As should now be apparent, it is possible to produce the natural numeral of column one with the corresponding numeral pair of column three and vice-versa. For example, using again the natural numeral 9, its corresponding numeral pair for this embodiment is [1, 3]. Here, 1 is the index for natural numeral 3, as indicated previously. Thus, 3 (corresponding to one) times 3 provides 9, in this example.

It is noted that, for this embodiment, it is not the case that employing the numeral pairs of column three always save a bit. However, for all cases, the binary representation associated with the third column, again, for this embodiment, will be less than or equal to the number of bits conventionally employed to represent the particular natural numeral. For example, consider natural numeral 8 in column one. The column three representation is [0, 4]. Eight is conventionally represented using four bits. Zero is represented using one bit. Four is represented using three bits. Therefore, both representations employ the same number of bits in this example, here, four. Thus, using this approach ensures that the same or fewer bits than is conventionally the case will represent a particular natural numeral Another feature of this particular embodiment, illustrated in FIG. 3, is the association of a unique finite multi-set with the natural numeral of column one and/or the numeral pair of column three. Consider, as previously discussed, producing the associated finite multi-set from the particular natural numeral. For this particular embodiment, it should also be possible to produce this finite multi-set from column three. Consider, for example, the case of natural numeral 105. The associated finite multi-set is {1, 2, 3}. Associated numerical pairs include: [1, 35]; [2, 21]; and [3, 15]. Here, the first numeral of the numeral pair is an element of the finite multi-set for this particular embodiment. The second numeral for the numeral pair is the product of the non-composite numerals associated with the remaining elements of the multi-set. For example, the non-composite numeral associated with 2 is 5 and the non-composite numeral associated with 3 is 7. Thus, the product of 5 and 7 is 35.

Thus, for this particular embodiment, the table of FIG. 3 provides, for a particular natural numeral, the finite multi-sets of the natural numeral and the numeral pair of the natural numeral. Likewise, the numeral pair of this embodiment is analogous to the Kleene enumeration extended to include composite numerals. In particular, using the fundamental principle of arithmetic, one may always break any natural numeral into a unique set of non-composite numerals. Table three makes use of this fundamental precept by replacing the non-composites with their associated indexes. Furthermore, as previously demonstrated, for any natural numeral, in this embodiment, there is an association between these indexes and the finite multi-sets of column two.

Another feature of this particular embodiment includes employing numeral pairs to perform multiplication. For example, natural numeral 3 is represented by the pair [1, 1]. Likewise, natural numeral 5 is represented by pair [2, 1]. In this particular embodiment, a general rule for combining numeral pairs is as follows:

$$[a,b] \text{ combined with } [c,d] = [a,b*(Q(c)*d)] \quad [1]$$

in which "*" represents multiplication and where the function $Q(c)$ is a function that provides the non-composite numeral associated with the index c, as for the Kleene enumeration.

Thus, in this example, merging the pairs produces the ordered pair [1, 5]. This numeral pair corresponds to the natural numeral 15, which is a product of 3 times 5. Furthermore, since, as previously demonstrated, column three provides a mechanism to represent the natural numeral of column one with the same or fewer bits, this also provides a mechanism to perform multiplication with the same of fewer bits than conventionally employed.

For this embodiment, the table of FIG. 3 provides a mechanism to manipulate finite multi-sets, or employing the language of computer science, to manipulate strings, using a table-driven mechanism. For example, multiplication, such as 3 times 5, combines the finite multi-sets corresponding to those natural numerals. This may be accomplished, for this embodiment, therefore, either by multiplying the natural numerals of column one or by using the merger operation of column three, as described above. Thus, by a table look up mechanism, strings may be combined, such as in the manner described above for this particular embodiment.

Figure 4:
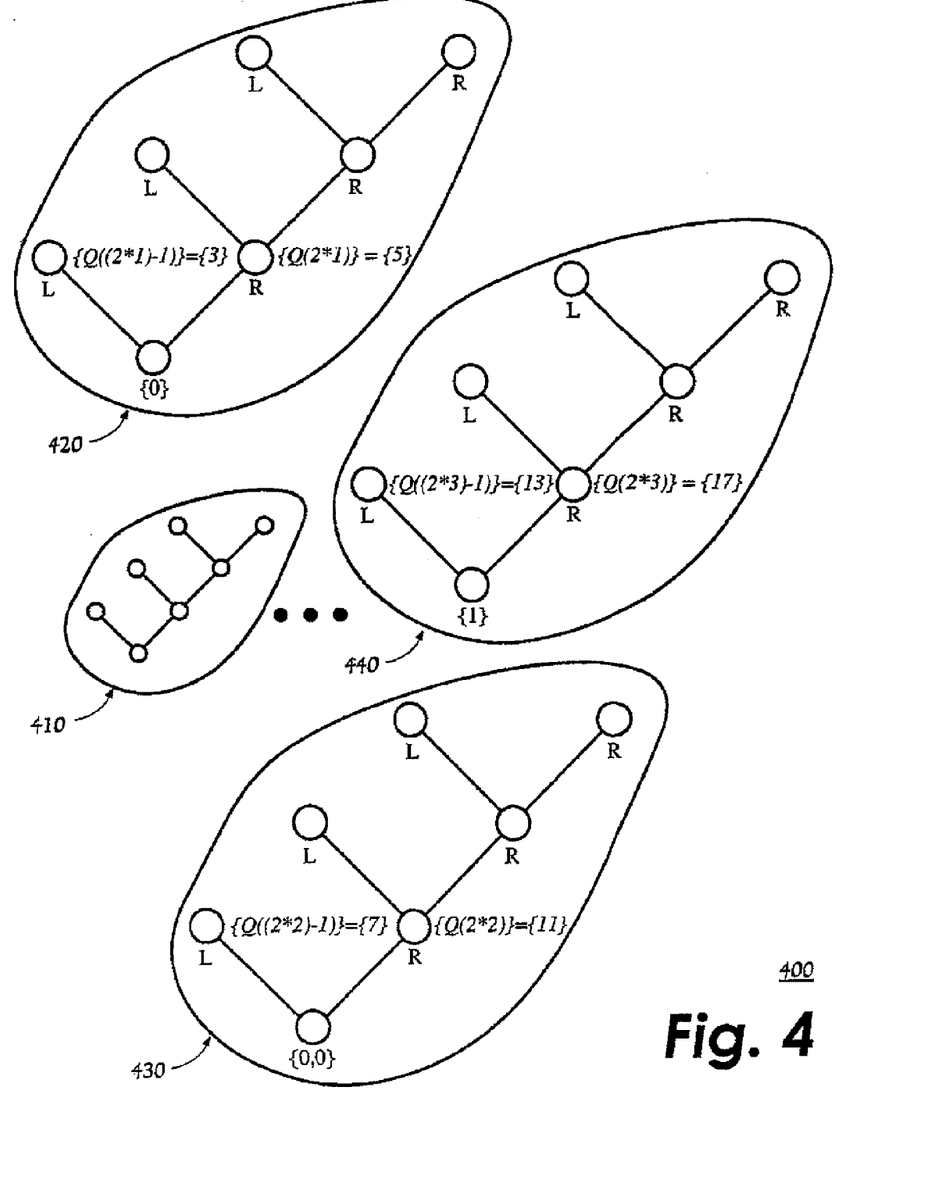
FIG. 4 is a schematic diagram illustrating another embodiment of a file location naming hierarchy.

Referring now to FIG. 4, a schematic diagram illustrates an embodiment of a binary tree file hierarchy "rooted" upon a finite multi-sets. As shall be explained in more detail hereinafter, this particular embodiment of a file hierarchy may be constructed based at least in part upon the table of FIG. 3. Consider, for example, the natural numeral 12 of column one. In column two, this corresponds to the finite multi-sets {0, 0, 1}. Using the table of FIG. 3, for this embodiment, associated with this finite multi-sets, and thus, also associated with natural numeral 12, are two unique non-composite numerals. It is noted that there are many different unique pairs of non-composite numerals that may be associated with natural numeral 12. This is merely one embodiment and the claimed subject matter is not limited in scope to this particular embodiment. However, one non-composite numeral comprises Q(2x), or here, Q(2*12), that is, Q(24). Another non-composite numeral comprises Q(2x−1), here, Q(23). As demonstrated by the binary tree file hierarchy embodiment illustrated in FIG. 4, this technique provides a file hierarchy of named file locations that is well-known to be useful for searching and/or sorting. See, for example, *The Art of Computer Programming, Vol.* 2: *Searching and Sorting*, by Donald K. Knuth, 3$^{rd}$ Edition, 1997, available from Addison Wesley Longman. Thus, the table of FIG. 3 provides an infinite number of binary trees, each binary tree associated with a finite multi-set associated with two or more natural numerals larger than one.

The table of FIG. 3 also provides another approach to moving between named files in a file structure or file hierarchy. For this particular embodiment, this is accomplished by associating at least some named files in the file structure with products of non-composite numerals, and associating other named files in the file structure with non-composite numerals. As shall be explained in more detail hereinafter, in such an embodiment, moving between named files in a file hierarchy may be accomplished via a mathematical operation, such as by dividing and/or multiplying with non-composite numerals.

Figure 5:
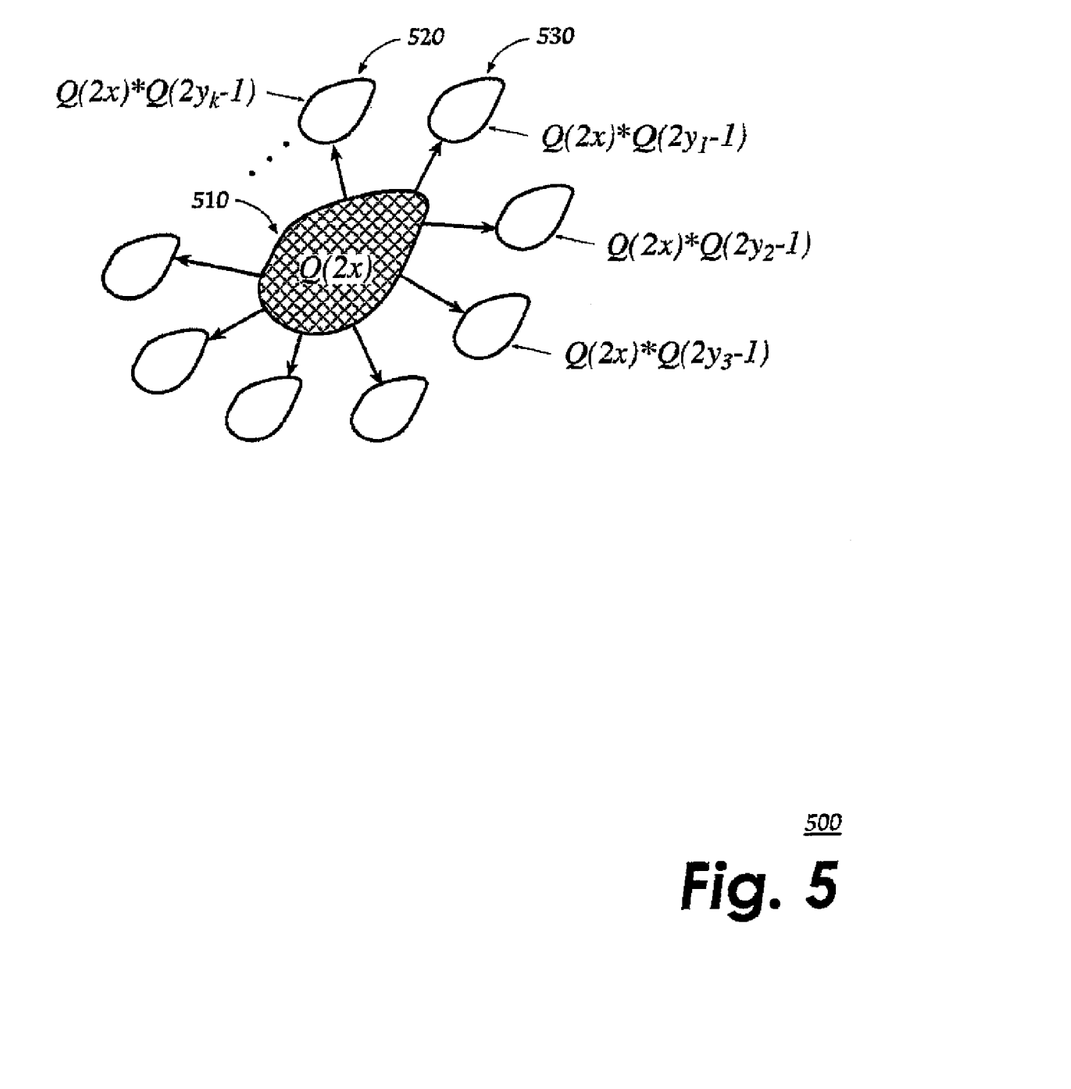
FIG. 5 is a schematic diagram illustrating yet another embodiment of a file location naming hierarchy.

As previously described and illustrated by the tree of FIG. 1, in a Unix-based operating system, it may be time consuming in a relative sense to move between files in a file structure, using serial access. FIG. 5 illustrates an embodiment of an alternate file hierarchy in which moving between named files may accomplished through mathematical manipulation, thus, potentially saving time. In FIG. 5, the nodes represent named files that have particular representations in memory. For this example, let file 510 have associated with it the non-composite numeral Q(2x) This is analogous or equivalent to root node 110 of FIG. 1. Emanating from file 510 are thus a potentially infinite number of named files, such as, for example, files 520 and 530. In this particular embodiment, these named files are located serially in memory based at least in part on a product of two non-composite numerals. Thus, for example, assume it is desirable to move between file 510 and file 520. This may be accomplished simply by dividing by the non-composite numeral $Q(2y_1-1)$ and then multiplying by the non-composite numeral $Q(2u_k-1)$. Thus, moving between these named file locations reduces to a mathematical calculation. It is noted that this is simply one particular embodiment of this approach and many other embodiments may be employed. For example, a non-composite numeral other than Q(2x) may be employed as the core and other named files associated with the core may be located in a manner other than as illustrated in FIG. 5. Thus, it is intended to cover all such embodiments regardless of the particular non-composite numerals employed to name and locate such files.

Furthermore, it will, of course, be appreciated that, for convenience, in a particular embodiment, a translation table between characters and non-composite numerals may also be employed. Thus, in a typical operation, a first file may have a named location represented as a sequence of characters and a table look-up may be employed to obtain its designation or named location in terms of non-composite numerals or products of non-composite numerals, such as an embodiment like the one previously described. Mathematical operations may then be applied to the non-composite numerals or the products of non-composite numerals, in such an embodiment, to locate the named file it is desired to locate and then a translation table may be employed to provide the characters associated with the resulting non-composite numeral or product of non-composite numerals. In this particular embodiment, therefore, the essence of manipulating files or moving between files in a file hierarchy is reduced to division of non-composite numerals and/or products of non-composite numerals. In general, therefore, a method of constructing a file structure may comprise associating at least some files with non-composite numerals. It is, therefore, intended to cover all embodiments of such a file hierarchy.

Figure 6:
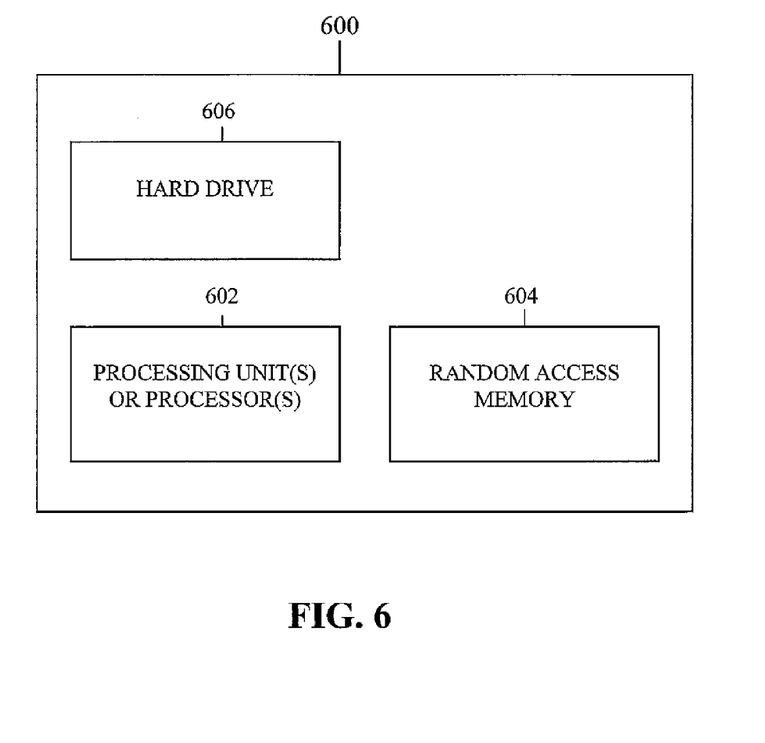
FIG. 6 is a schematic diagram of a computing platform according to an embodiment.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform (e.g., such as computing platform 600 shown in FIG. 6), or other system, for example, may result in an embodiment of a method in accordance with the claimed subject matter being executed, such as one of the embodiments previously described, for example. As one potential example, a computing platform 600 shown in FIG. 6 may include one or more processing units or processors 602, one or more input/output devices (not shown), such as a display, a keyboard and/or a mouse, and/or one or more memories, such as random access memory 604 (e.g., static random access memory or dynamic random access memory), flash memory (not shown), and/or a hard drive 606. For example, a display may be employed to display one or more queries, such as those that may be inter-related, and or one or more tree expressions, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. An article comprising:
   a memory having stored thereon a file; said file having a named location; said named location being part of a binary tree file location naming hierarchy at least formed from a finite multi-set by:
   an association of said finite multi-set with a natural numeral; and
   an association of a first non-composite numeral and a second non-composite numeral with said natural numeral, said non-composite numerals and said finite multi-set forming at least a portion of said hierarchy.

2. The article of claim 1, wherein said file location naming hierarchy is further formed by: said finite multi-set representing a named location for a file in said hierarchy, and said first and second non-composite numerals representing additional named locations for related files in said hierarchy.

3. The article of claim 1, wherein said file location naming hierarchy is further formed by:
   an association of a plurality of binary trees with finite multi-sets, each binary tree associated with a finite multi-set further associated with two or more natural numerals larger than one.

4. An apparatus comprising:
   a processor; said processor being adapted to form a binary tree file location naming hierarchy from a finite multi-set as follows:
   associating said finite multi-set with a natural numeral;
   associating a first non-composite numeral and a second non-composite numeral with said natural numeral, said non-composite numerals and said finite multi-set forming at least a portion of said hierarchy.

5. The apparatus of claim 4, wherein said processor being further adapted to represent a named location for a file in said hierarchy with said finite multi-set, and to represent additional named locations for related files in said hierarchy with said first and second non-composite numerals.

6. The apparatus of claim 4, wherein said processor is further adapted to associate a plurality of number of binary trees with finite multi-sets, each binary tree associated with a finite multi-set further associated with two or more natural numerals larger than one.

* * * * *